United States Patent
Kano et al.

(10) Patent No.: US 7,019,931 B2
(45) Date of Patent: Mar. 28, 2006

(54) TAPE DRIVE APPARATUS

(75) Inventors: Yasuaki Kano, Kanagawa (JP); Atsushi Mitani, Tokyo (JP); Masaki Yoshizawa, Saitama (JP); Toshiya Kurokawa, Kanagawa (JP)

(73) Assignee: Sony Corporation, (JP)

( * ) Notice: Subject to any disclaimer, the term of this patent is extended or adjusted under 35 U.S.C. 154(b) by 144 days.

(21) Appl. No.: 10/725,386

(22) Filed: Dec. 3, 2003

(65) Prior Publication Data
US 2004/0109254 A1 Jun. 10, 2004

(30) Foreign Application Priority Data
Dec. 10, 2002 (JP) ............................ P2002-358579

(51) Int. Cl.
*G11B 15/18* (2006.01)
(52) U.S. Cl. ..................... 360/69; 360/71; 360/77.17
(58) Field of Classification Search ................ 360/69, 360/71, 77.17
See application file for complete search history.

(56) References Cited

U.S. PATENT DOCUMENTS 5,461,520 A * 10/1995 Kobayashi et al. ........... 360/71

* cited by examiner

*Primary Examiner*—David Hudspeth
*Assistant Examiner*—Mitchell Slavitt
(74) *Attorney, Agent, or Firm*—Rader, Fishman & Grauer PLLC; Ronald P. Kananen

(57) ABSTRACT

The present invention provides a tape drive apparatus enabled to directly and accurately detect dew condensation on a rotary head drum. Tape serving as a recording medium is drawn out of a cartridge. The drawn tape runs in such a way as to be wound on a tape takeup reel provided in a tape drive apparatus body. Signals are recorded on and reproduced from the tape by winding the drawn tape around the rotary head drum. This tape drive apparatus has a prethreading mechanism that brings the tape into slight contact with the rotary head drum before the tape is completely wound therearound. Dew condensation on the rotary head drum is detected by rotating the rotary head drum during a status in which the tape is brought by the prethreading mechanism into contact with the rotary head drum.

17 Claims, 16 Drawing Sheets

TAPE DRIVE APPARATUS

CROSS REFERENCE TO RELATED APPLICATIONS

The present document is based on Japanese Priority Application JP2002-358579, filed in the Japanese Patent Office on Dec. 10, 2002, the contents of which are incorporated herein by reference to the extent permitted by law.

BACKGROUND OF THE INVENTION

1. Field of the Present Invention

The present invention relates to a helical scan type tape drive apparatus adapted so that tape is drawn out of a cartridge accommodating the tape serving as a recording medium, the drawn tape is caused to run in such a way as to be wound onto a tape takeup reel provided in a drive apparatus body, and the tape drawn out of the cartridge is wound around a rotary head drum so that signals are recorded thereon and reproduced therefrom. More particularly, the present invention relates to a mechanism for detecting dew condensation on the rotary head drum.

2. Description of the Related Art

There has been widely practiced a recording/reproducing apparatus of the helical scan type that records and reproduces signals by drawing tape, which serves as a recording medium, out of a cartridge in which the tape is accommodated and by winding this tape around a rotary head drum.

In recent years, for recoding/reproducing apparatuses of such kind, there has been proposed a tape drive apparatus using what is called a single reel type cartridge (see, for example, Japanese Patent Application Laid-Open No. 2002-237117).

In other words, the single reel type cartridge used in this tape drive apparatus is adapted to accommodate only one tape supply reel, around which a tape serving as a recording medium is wound. At the drive apparatus body, tape is drawn out of the tape supply reel when this cartridge is inserted therein. This tape is carried in such a way as to be wound by a tape takeup reel provided in the drive apparatus body. Thus, the tape drive apparatus operates such that tape running is performed in this manner.

An outline of a conventional tape drive apparatus of such kind is described hereinbelow with reference to FIG. 14 to FIG. 16.

FIG. 14 shows an entire configuration of the tape drive apparatus. In an apparatus body 1 of this tape drive apparatus, a section, in which a cartridge 4 is mounted, and a tape takeup reel 6 are disposed on a base chassis 2 so that a rotary head drum 3 is interposed therebetween.

A tape supply reel 5 is rotatably accommodated in a cartridge 4, around which tape serving as a recording medium (or magnetic tape) is wound. A carrying mechanism 7 for drawing tape from the tape supply reel 5 provided in the cartridge 4 and for carrying the tape to the tape takeup reel 6 is placed between the section in which this cartridge 4 is mounted and the tape takeup reel 6.

This carrying mechanism 7 is constructed on a subplate 8 fixed onto an upper section of the apparatus body 1. That is, on this subplate 8, a guide shaft 9 is provided in such a way as to extend over the section, in which this cartridge 4 is mounted and the tape takeup reel 6. A chucking mechanism 10 is provided on this guide shaft 9 in such a manner as to be able to move therealong. This chucking mechanism 10 is connected to a feed belt 12 driven by a motor 11. That is, this carrying mechanism 7 has a structure in which the feed belt 12 is driven by the motor 11, thereby to move the chucking mechanism 10 along the guide shaft 9.

A chucking member to be engaged with a leader block 13 (see FIG. 15) attached to an end of tape T is mounted on this chucking mechanism 10. When the cartridge 4 is mounted on the apparatus body 1, this chucking member engages with and chucks the leader block 13. Then, the motor 11 drives the chucking mechanism 10 from this state, so that the chucking mechanism 10 is moved from the side of the cartridge 4 toward the tape takeup reel 6. Thus, the leader block 13 is carried along a guide groove 14 formed in the subplate 8. Consequently, the tape T is drawn out of the cartridge 4 and carried to a position where the tape T is wound up by the tape takeup reel 6.

Thus, the leader block 13 carried by the carrying mechanism 7 is fixed to the tape takeup reel 6 in a state in which the leader block 13 is fitted into a central section of the tape takeup reel 6 from a lead-in groove 15, as shown in FIGS. 15 and 16. Thereafter, a tape winding mechanism operates, so that the tape T is wound around the rotary head drum 3 by tape winding members 16 and 17.

These tape winding members 16 and 17 have guide rollers 20 and 21 and inclined guide posts 22 and 23 on movement plates 18 and 19, respectively. The movement plates 18 and 19 are adapted to be moved to positions shown in FIG. 15 and FIG. 16, respectively. Thus, the guide rollers 20 and 21 and the inclined guide posts 22 and 23 draw the tape T, so that the tape T is wound around the rotary head drum 3 at an angle (about 200 degrees) set to be within a predetermined range. Incidentally, the movement plates 18 and 19 of these tape winding members 16 and 17 are adapted to be moved along guide grooves 24 and 25 provided in both sides of the rotary head drum 3, respectively, as shown in FIG. 14.

Reference numerals 26, 27, 28, and 29 designate guide rollers. Along with winding of the tape T around the rotary head drum 3, these guide rollers are moved from a position shown in FIG. 15 to a position shown in FIG. 16. Thus, a predetermined tape path is formed.

Reference numeral 30 denotes a tension regulator. This tension regulator 30 has a roller 33 provided at a tip end of an arm 32 that is turned around a shaft 31 serving as a fulcrum. During a state in which the tape T is wound around the rotary head drum 3 as shown in FIG. 16, the roller 33 of this tension regulator 30 is brought into rolling contact with the tape T by the force of a spring (not shown). Thus, predetermined tension is given to the tape T.

Thus, the tape takeup reel 6 is rotation-driven thereby to wind up the tape T, which has been wound around the rotary head drum 3, onto the tape takeup reel 6, thus the tape T runs and at the same time the rotary head drum 3 is rotation-driven. Thus, a signal is recorded onto or reproduced from the tape T.

SUMMARY OF THE INVENTION

Meanwhile, in the case of using the helical scan type recording/reproducing apparatus adapted to perform recoding/reproducing by winding tape around the rotary head drum, dew condensation may occur on the rotary head drum when the apparatus is disposed at a place that is subject to high temperature and high humidity.

In the case where dew condensation occurs on this rotary head drum, when the tape is wound therearound, the tape is stuck thereon and disabled from running. Therefore, it is necessary to detect preliminarily and accurately dew condensation so as to control the tape winding operation.

Hitherto, a system including a dew condensation sensor, which is placed in the vicinity of this rotary head drum and adapted to indirectly detect the status thereof, has been used as a conventional means for detecting dew condensation on the rotary head drum.

However, this conventional system adapted to indirectly detect dew condensation on the rotary head drum by using such a sensor has drawbacks in that the sensor takes time to detect dew condensation, and thus the current dew condensation status of the rotary head drum cannot be accurately detected.

Additionally, the conventional system has another drawback in that this system does not have a function of preliminarily preventing tape damage by detecting, when a cartridge is loaded, dew condensation when the tape is drawn out of the cartridge and before the tape is wound up on the rotary head drum.

The present invention has been conceived in view of the problems existing in the related art, so as to provide a highly reliable tape drive apparatus by adding a new mechanism, which is enabled to accurately detect dew condensation on a rotary head drum when dew condensation occurs thereon.

As a result, according to a preferred embodiment of the present invention, there is provided a tape drive apparatus which is adapted so that a tape serving as a recording medium is drawn out of a cartridge accommodating the tape, the drawn tape is made to run in such a way as to be wound on a tape takeup reel provided in a tape drive apparatus body, and recording and reproducing of a signal are performed by winding the tape drawn out of the cartridge around a rotary head drum. Such tape drive apparatus comprises a prethreading mechanism for bringing the tape into slight contact with the rotary head drum before the tape is completely wound around the rotary head drum. In this apparatus, dew condensation on the rotary head drum is detected by rotating the rotary head drum during a state in which the tape is brought by the prethreading mechanism into contact with the rotary head drum.

In this case, when dew condensation occurs on the rotary head drum, an increase in the friction between the rotary head drum and the tape results in a variation in rotation of the rotary head drum. Dew condensation on the rotary head drum is detected by detecting the variation in rotation of the rotary head drum.

Alternatively, dew condensation on the rotary head drum may be detected by detecting change in the tension of the tape or rotation of a tape supply reel.

Additionally, the tape drive apparatus according to the preferred embodiment of the present invention may be adapted so that the tape is detached from the rotary head drum after the dew condensation on the rotary head drum is detected as described above and the rotary head drum is rotated during this state. Thus, the drying of the rotary head drum is expedited.

The tape drive apparatus according to the present invention is adapted so that the prethreading mechanism brings tape into slight contact with the rotary head drum before the tape is completely wound around the rotary head drum, and then, during this state, the rotary head drum is rotated thereby to detect dew condensation on the rotary head drum. Thus, when dew condensation occurs on the rotary head drum, this dew condensation can be directly detected. Therefore, as compared with the conventional indirect dew condensation detecting method using a dew condensation sensor, accurate dew condensation detection is achieved in a short time. Additionally, the tape drive apparatus according to the present invention is also adapted so that the tape is detached from the rotary head drum after the dew condensation on the rotary drum head is detected and, during this state, the rotary head drum is rotated thereby to expedite drying of the rotary head drum. Thus, dew condensation on the rotary head drum can be eliminated in a short time. Consequently, the present invention provides a highly reliable tape drive apparatus enabled to prevent an occurrence of a tape running failure.

BRIEF DESCRIPTION OF THE DRAWINGS

The above and other features, objects and advantages of the present invention will become more apparent from the following description of the exemplary preferred embodiments of the invention taken in conjunction with the accompanying drawings, in which.

DETAILED DESCRIPTION OF THE PREFERRED EMBODIMENTS

Hereinafter, preferred embodiments of the present invention will be described in detail by referring to the accompanying drawings.

Figure 1:
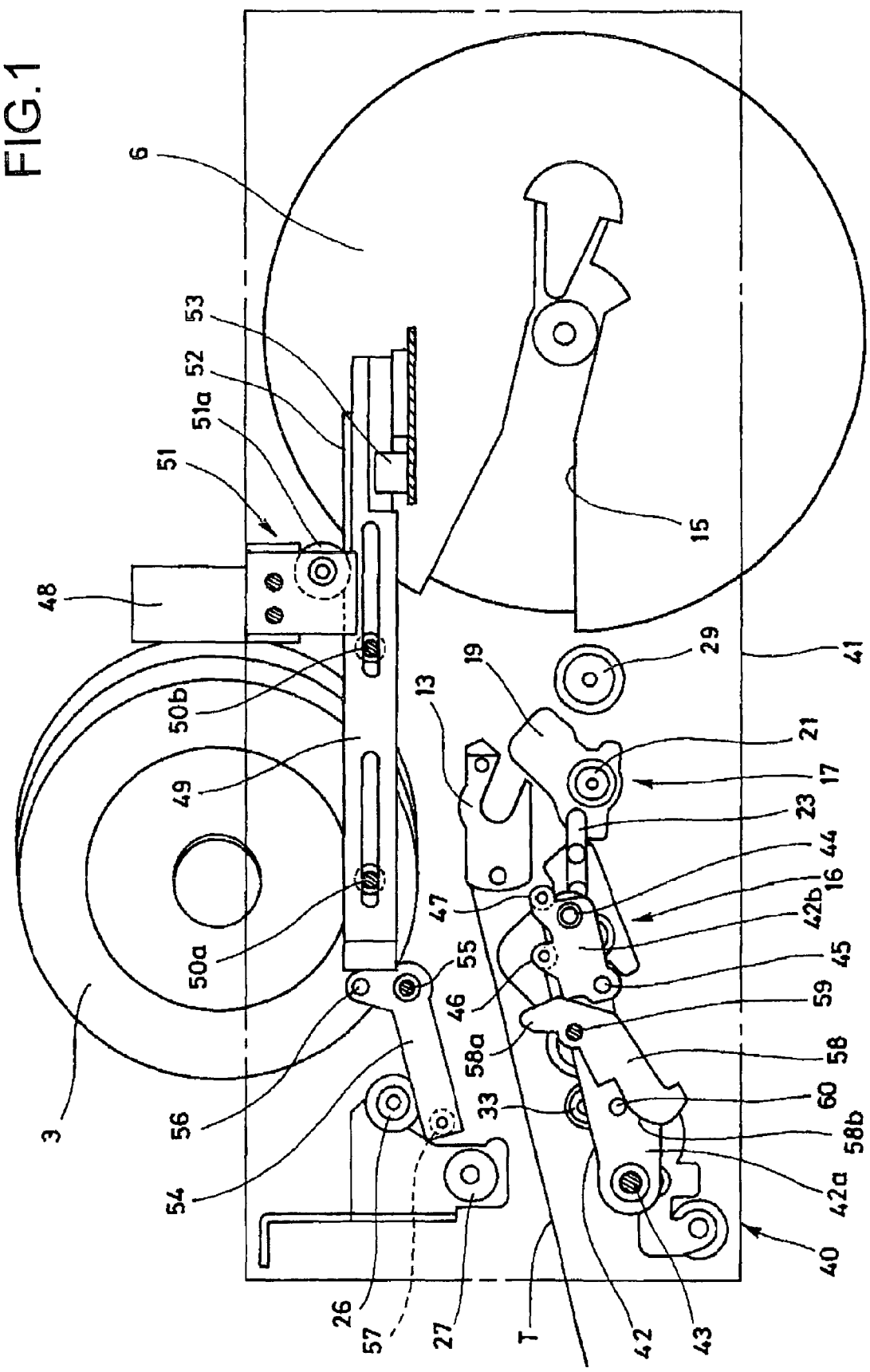
FIG. 1 is a plan view showing the configuration of a major section of a tape drive apparatus according to a preferred embodiment of the present invention.
Figure 14:
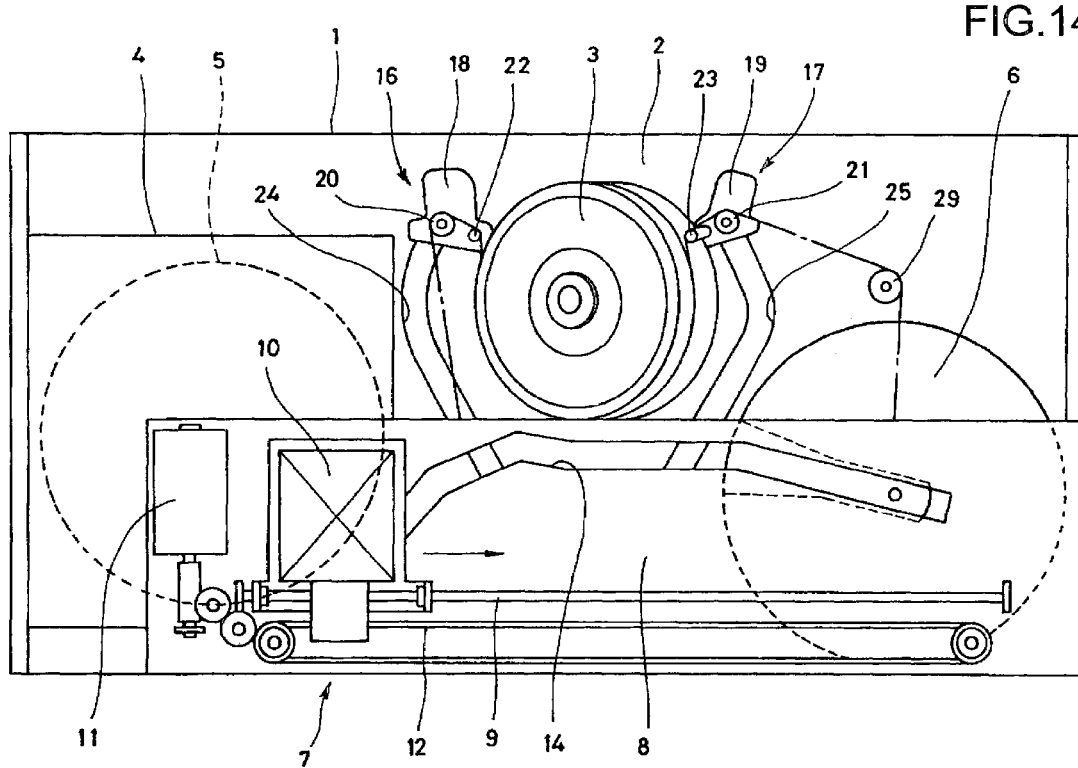
FIG. 14 is a plan view showing the configuration of a conventional tape drive apparatus.
Figure 15:
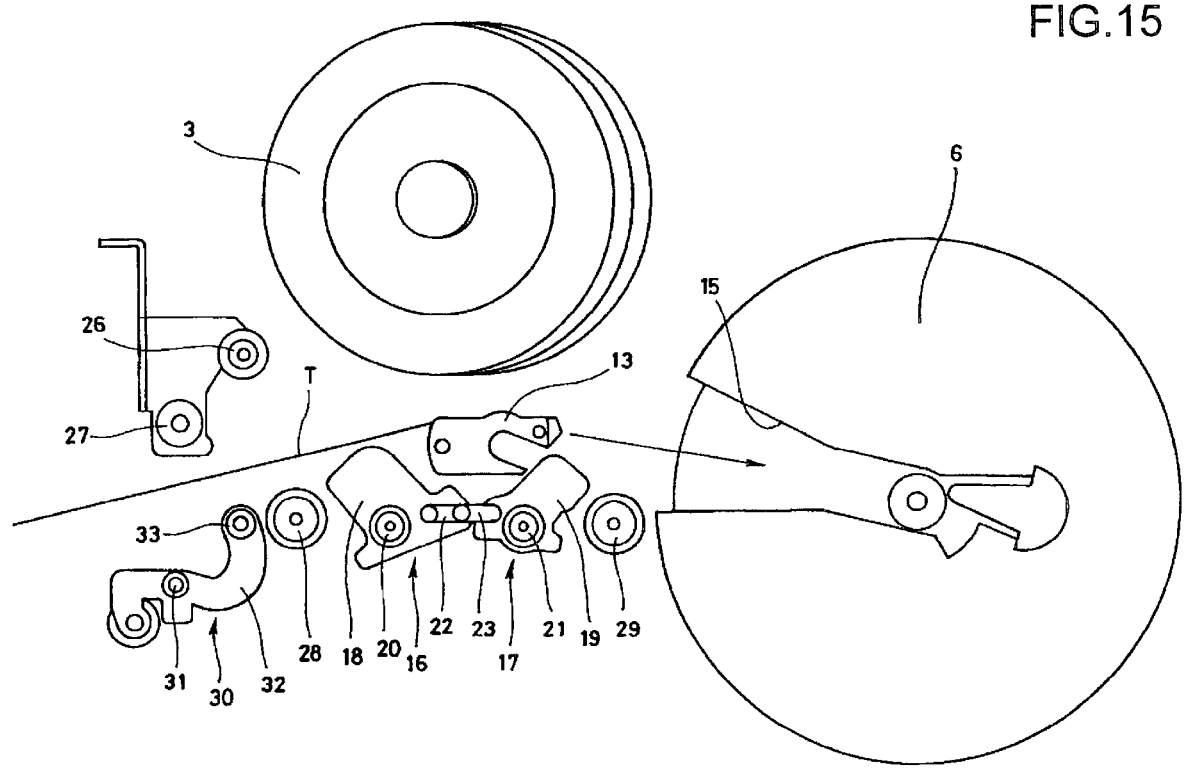
FIG. 15 is a plan view showing the configuration of a major section of the conventional tape drive apparatus.
Figure 16:
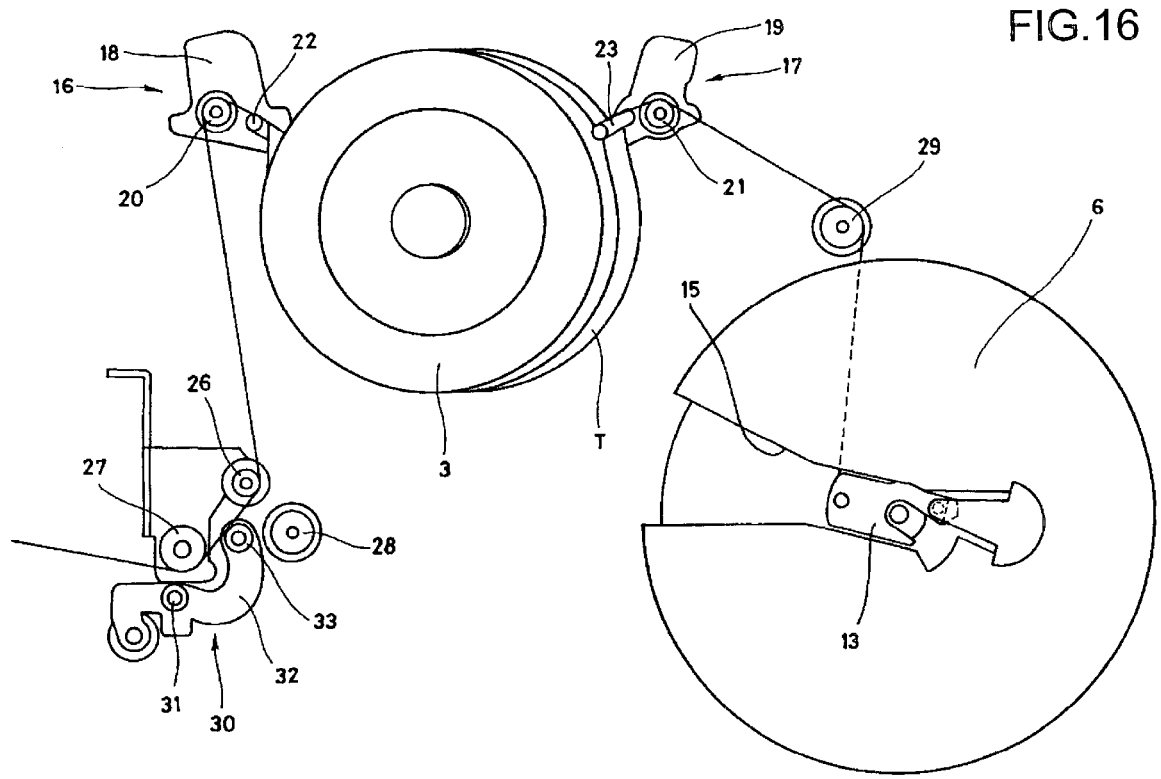
FIG. 16 is a plan view showing a state, in which tape is wound around a rotary head drum, of the conventional tape drive apparatus.

FIG. 1 shows a tape drive apparatus as a preferred embodiment of the present invention. This tape drive apparatus is configured on a base of the configuration of the conventional tape drive apparatus, which is shown in FIGS. 14 to 16, by adding a prethreading mechanism 40 thereto as a new mechanism.

This prethreading mechanism 40 brings the tape T into slight contact with the rotary head drum 3 before the tape T is completely wound up around the rotary head drum 3.

Figure 5:
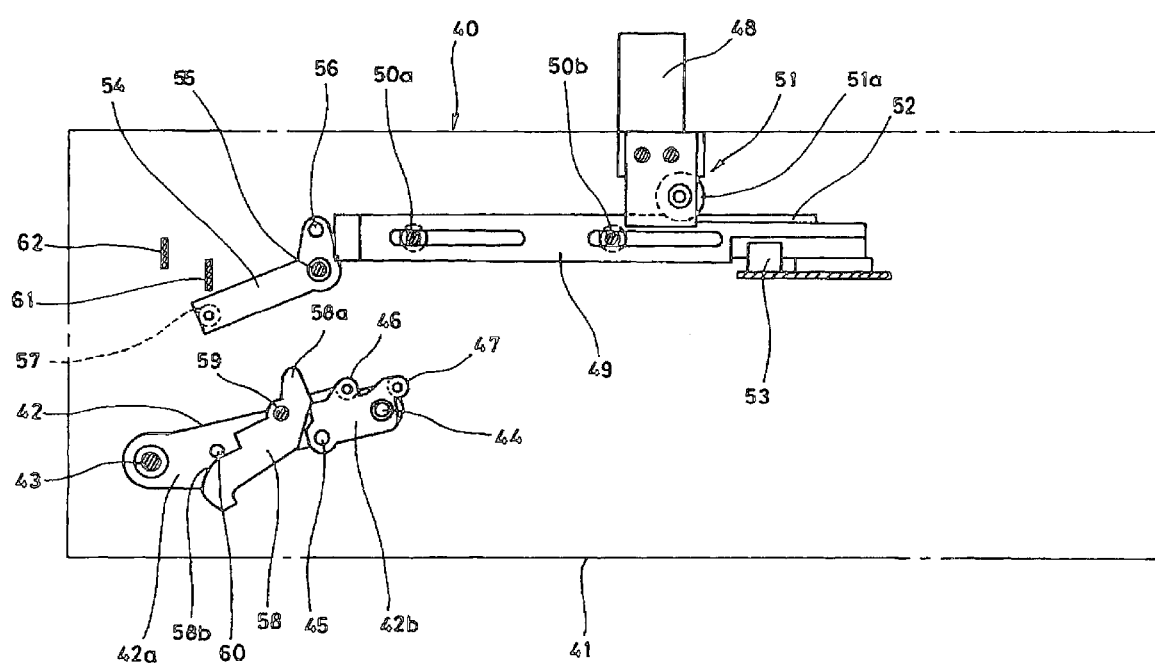
FIG. 5 is a plan view showing the configuration and an initial state of an operation of the prethreading mechanism, according to a preferred embodiment of the present invention.

FIG. 5 shows the configuration of this prethreading mechanism 40. The prethreading mechanism 40 is configured on the bottom surface of a supporting plate 41 that is fixed to an upper part of the tape drive apparatus. FIG. 5 shows only constituent components of this prethreading mechanism 40 by being selected from this embodiment. Incidentally, the supporting plate 41 on which this prethreading mechanism 40 is configured may be constituted by the subplate 8 of the tape drive apparatus shown in FIG. 14.

This prethreading mechanism 40 comprises a prethreading arm 42 for drawing the tape T out of a cartridge and for bringing the tape T into contact with the rotary head drum 3, a motor 48 serving as a drive source for this prethreading arm 42, a slide lever 49 for transmitting a driving force of this motor 48 to the prethreading arm 42, and two turning levers 54 and 58.

The prethreading arm 42 is disposed at a place on a path through which the tape T is carried by the carrying mechanism 7, so that this place is closer to a tape supply side than the rotary head drum 3 and the prethreading arm 42 is turned at this place. This prethreading arm 42 is a folding two-stage arm, that is, it consists of a first arm 42a and a second arm 42b. The first arm 42a is attached to the supporting plate 41 in such a way as to be able to turn at an end thereof around a support shaft 43. A second arm 42b is turnably connected to a leading end of this first arm 42a by a connection shaft 44. A prethreading pin 45 for drawing the tape T out of the cartridge is provided at a leading end of the second arm 42b. The second arm 42b is provided with abutting rollers 46 and 47 that respectively abut against contact pieces 61 and 62 (to be described later).

The first arm 42a is always turned and biased by a return spring (not shown), as shown in FIG. 5, in such a way as to be returned to an initial position. The second arm 42b is enabled to turn between a folded position, which is shown in FIG. 5, and an extended position to which the second arm 42b is turned 180° around the connection shaft 44 from the folded position. The second arm 42b is turned and biased by a toggle spring (not shown) toward the folded position and the extended position from the middle point between these two positions, which serves as a boundary therebetween. Incidentally, the second arm 42b is held at the folded position in an initial state.

A slide lever 49 for transmitting a driving force of the motor 48 to the prethreading arm 42 is slidably attached to the supporting plate 41 by supporting-pins 50a, 50b. This slide lever 49 is dynamically connected to the motor 48 through a gear mechanism 51. That is, the last gear 51a of the gear mechanism 51 is meshed with a rack section 52 of the slide lever 49. Thus, the driving force of the motor 48 is transmitted to the slide lever 49, so that the slide lever 49 slides. A photosensor 53 detects a sliding position of the slide lever 49. According to this detection, an operation of the prethreading mechanism 40 is controlled.

A member for transmitting an operating force of this slide lever 49 to the prethreading arm 42 comprises two turning levers, that is, a first turning lever 54 and a second turning lever 58.

The first turning lever 54 is nearly L-shaped and attached to the supporting plate 41 in such a way as to be able to turn around a supporting shaft 55. A receiving pin 56 corresponding to an edge of the slide lever 49 is provided at an end section of the first turning lever 54. At the other end section of the first turning lever 54, a pressing roller 57 adapted to abut against and push an end section 58a of the second turning lever 58 is provided. The first turning lever 54 is turned and biased by a return spring (not shown) in such a manner as to return to an initial position (shown in the figure).

The second turning lever 58 is attached to the supporting plate 41 in such a way as to be able to turn around a supporting shaft 59. The end section 58a of the second turning lever 58 is pushed by the pressing roller 57 of the first turning lever 54, as will be described later. A cam edge section 58b is formed at the other end section of the second turning lever 58. This cam edge section 58b is made to abut against the receiving pin 60 provided in the first arm 42a of the prethreading arm 42. Similarly, the second turning lever 58 is always turned and biased by a return spring (not shown) in such a way as to return to an initial position shown in the figure.

Contact pieces 61 and 62 are provided at places on the supporting plate 41, against which the abutting rollers 46 and 47 of the second arm 42b when the prethreading arm 42 is turned. When the abutting rollers 46 and 47 respectively abut against the contact pieces 61 and 62, as will be described later, the second arm 42b is turned to the first arm 42a.

Next, an operation of the prethreading mechanism 40 configured as described above is described hereinbelow.

Figure 6:
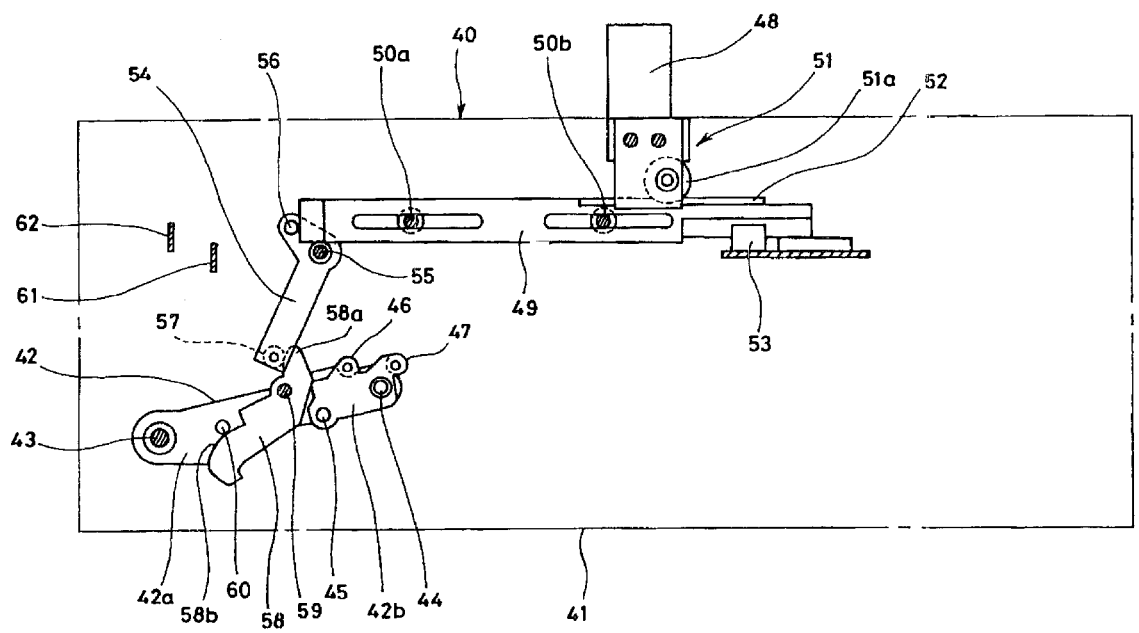
FIG. 6 is an explanatory view showing a continuation of the operation shown in FIG. 5.

When the motor 48 having been in an initial state shown in FIG. 5 is driven, the slide lever 49 slides leftwardly, as viewed in the figure. An edge of the slide lever 49 abuts against and pushes the receiving pin 56 of the first turning lever 54. Thus, the first turning lever 54 is turned about the supporting shaft 33 counterclockwise, as viewed in FIG. 2. The pressing roller 57 of the first turning lever 54 abuts against and pushes the end section 58a of the second turning lever 58 (see FIG. 6).

Thus, the second turning lever 58 is turned about the supporting shaft 59, as viewed in the figure. The cam edge section 58b of the second turning lever 58 pushes the receiving pin 69. Consequently, the first arm 42a of the prethreading arm 42 is turned about the supporting shaft 43, as viewed in the figures (see FIG. 7 to FIG. 10).

Figure 7:
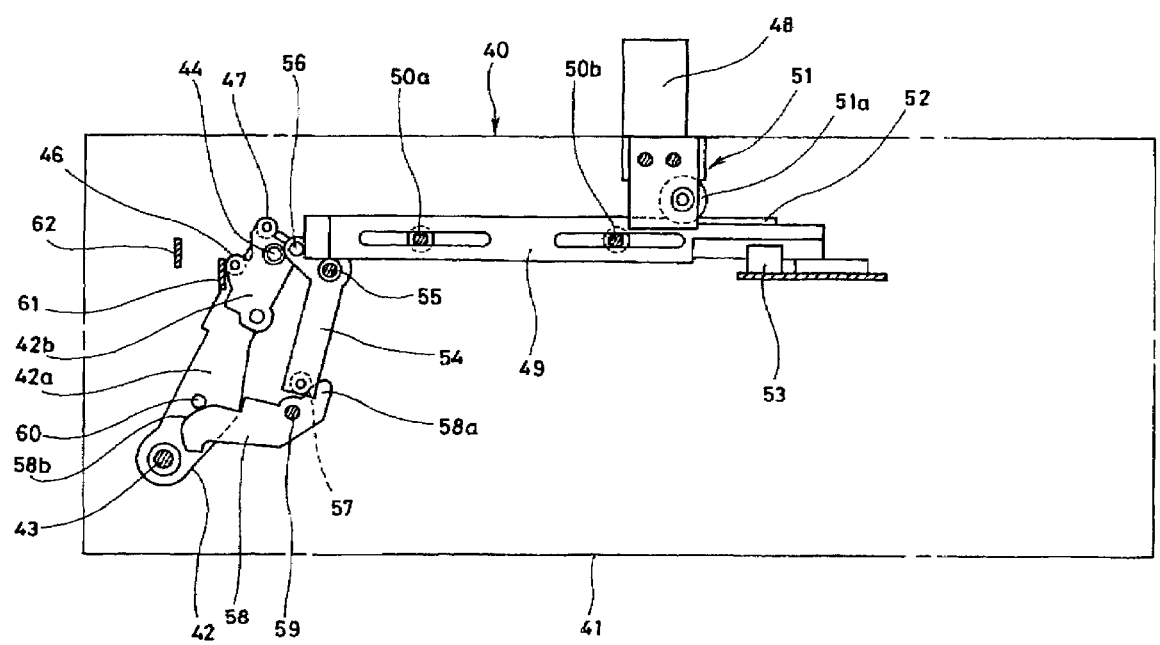
FIG. 7 is an explanatory view showing a continuation of the operation shown in FIG. 6.
Figure 8:
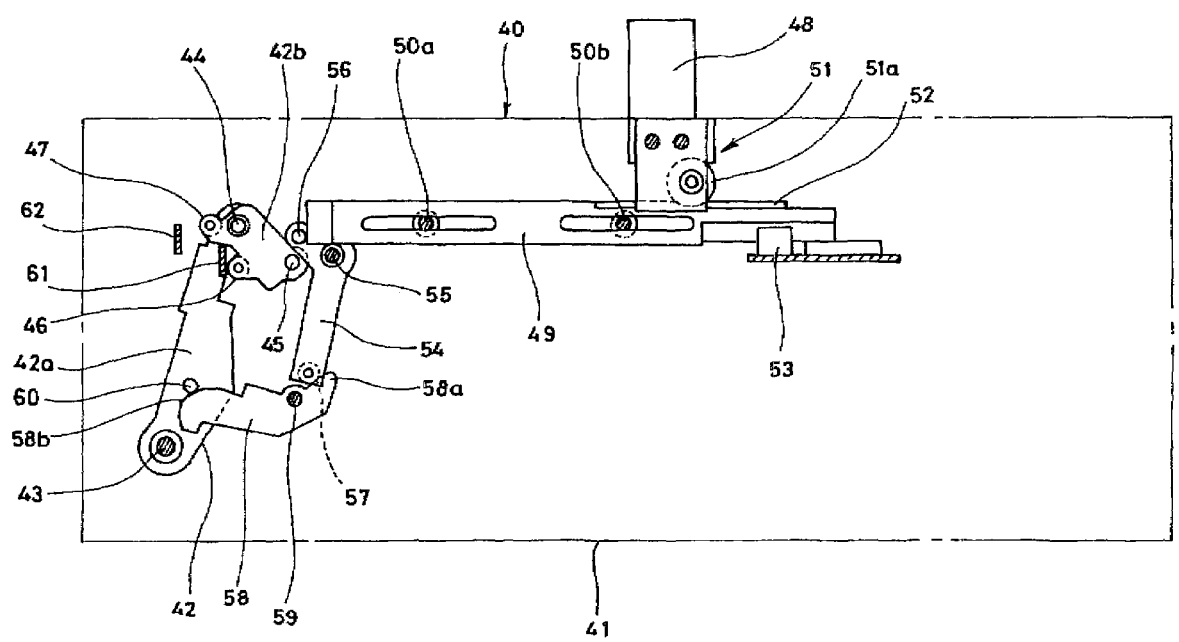
FIG. 8 is an explanatory view showing a continuation of the operation shown in FIG. 7.
Figure 9:
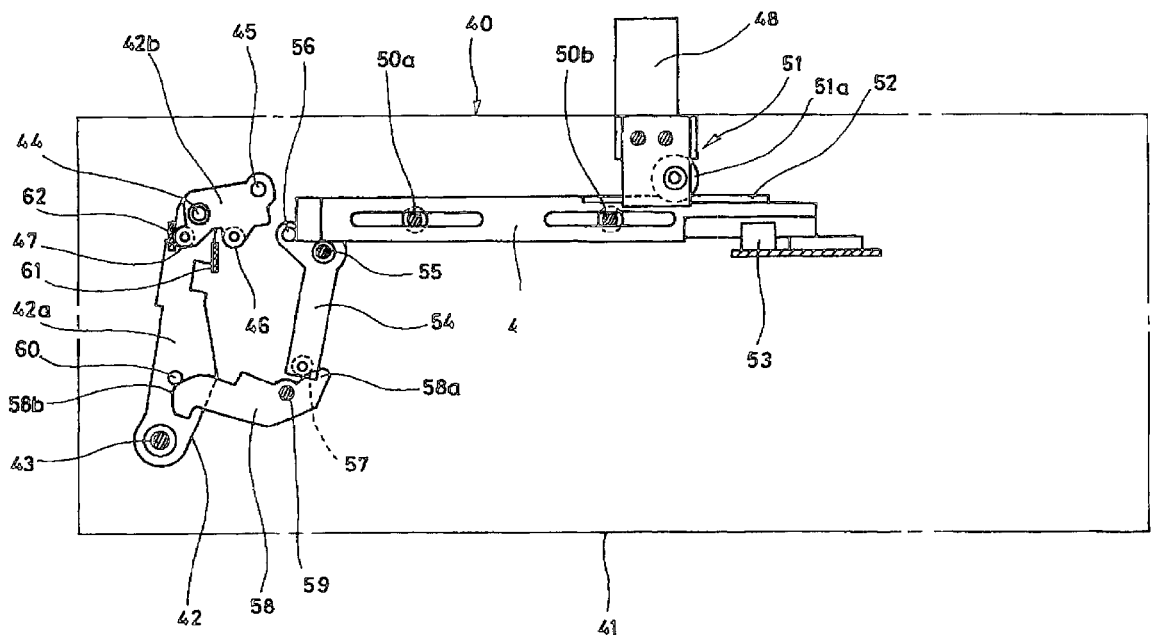
FIG. 9 is an explanatory view showing a continuation of the operation shown in FIG. 8.
Figure 10:
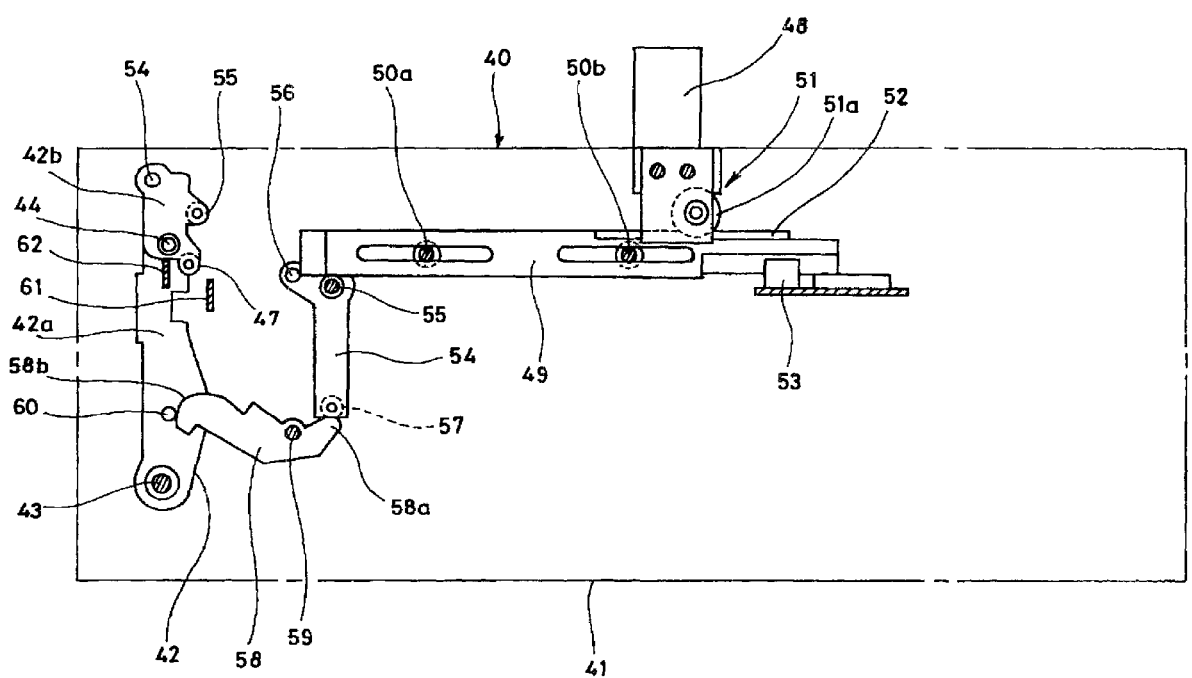
FIG. 10 is an explanatory view showing a continuation of the operation shown in FIG. 9.

In the operation of turning the prethreading arm 42, first, the abutting roller 46 of the second arm 42b abuts against the contact piece 61, as shown in FIGS. 7 and 8. Thus, the second arm 42b is turned about the connection shaft 44 from the folded position to the extended position with respect to the first arm 42a. Subsequently, as shown in FIG. 9, the abutting roller 47 abuts against the contact piece 62. Thus, the second arm 42b is turned still more. When turned thereto, the second arm 42b is turned automatically by the force of the toggle spring to the extended position. In the state in which the prethreading arm 42 is turned to a final position, as shown in FIG. 10, the second arm 42b is completely turned to the extended position. Consequently, the prethreading arm 42 is brought into an extended state.

This prethreading mechanism 40 is adapted to operate when the tape T is drawn out of the cartridge 4 and carried by the carrying mechanism 7 to a predetermined position where the leader block 13 does not reach the tape takeup reel 6. As described above, the prethreading arm 42 is turned, so that a prethreading pin 45 draws the tape T and brings the tape T into slight contact with the rotary head drum 3.

Figure 2:
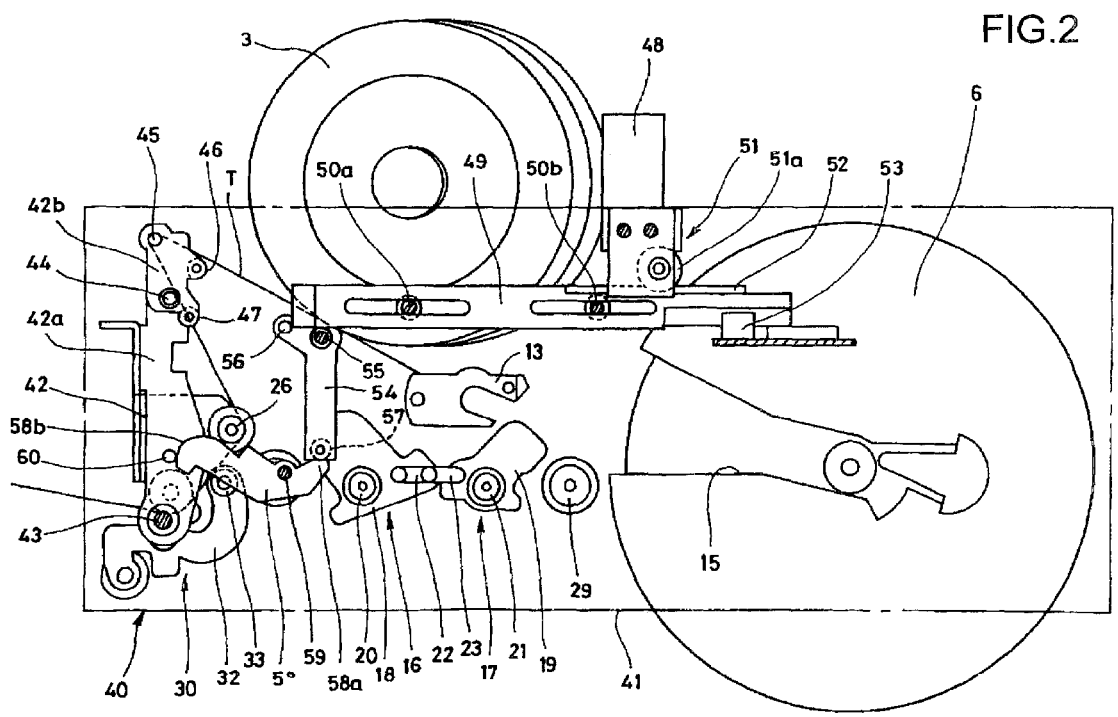
FIG. 2 is a plan view showing a state in which a prethreading mechanism causes tape to be in contact with a rotary head drum, according to a preferred embodiment of the present invention.
Figure 3:
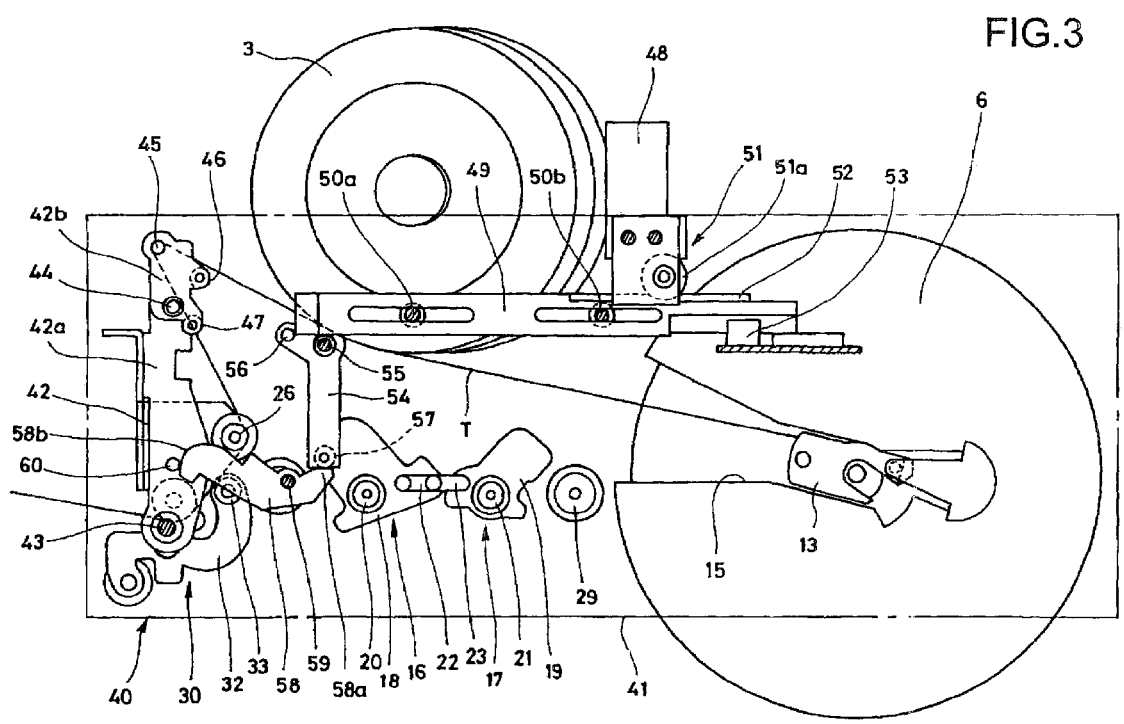
FIG. 3 is a plan view showing a state in which a leader block is carried to a position where the leader block is wound up by a takeup reel, according to a preferred embodiment of the present invention.

FIG. 2 shows a state in which the tape T is put into slight contact with the rotary head drum 3 by the prethreading mechanism 40. In the tape drive apparatus according to this embodiment, dew condensation is detected by rotating the rotary head drum 3 during a state in which the tape T is in contact with the rotary head drum in this manner.

This dew-condensation detecting operation is continued until the leader block 13 reaches a position where the leader block is wound on the tape takeup reel 6. Only in the case that dew condensation is detected, the rotation of the rotary head drum 3 is stopped immediately. Then, the apparatus performs an operation of returning the prethreading arm 42 to thereby return the leader block to the cartridge 4.

The detection of dew condensation on the rotary head drum 3 is performed as follows.

In this case, the rotary head drum 3 is rotation-driven during a state in which the tape T is in contact with the rotary head drum 3 as described above at a speed that is lower than the speed in the case of performing ordinary recording/reproducing of signals. At that time, in a case where dew condensation occurs on the rotary head drum 3, friction between the rotary head drum 3 and the tape T increases. Thus, the rotary head drum 3 pulls the tape T. This results in variation in rotation of the rotary head drum 3. The tape drive apparatus according to this embodiment detects the variation in the rotation of the rotary head drum 3 by using a rotation detector provided in a drum motor. Consequently, an occurrence of dew condensation on the rotary head drum 3 is detected.

Also, tension of the tape T is changed by the pulling of the tape T, which is caused by dew condensation on the rotary head drum 3. In the tape drive apparatus according to this embodiment, dew condensation on the rotary head drum 3 can be detected by using the tension regulator 30 to thereby detect change in the tension of the tape T. In this case, in the tension regulator 30, a detector is provided under the arm 32. This detector detects change of the arm 32, that is caused by change in tension of the tape T. Thus, dew condensation on the rotary head drum 3 is detected.

The pulling of the tape, that is caused by dew condensation on the rotary head drum 3 results in a state in which the tape supply reel 5 provided in the cartridge 4 rotates.

In the tape drive apparatus according to this embodiment, rotation of the tape supply reel 5 may be detected by a rotation detector provided in a reel motor. This also enables the detection of dew condensation on the rotary head drum 3.

Figure 11:
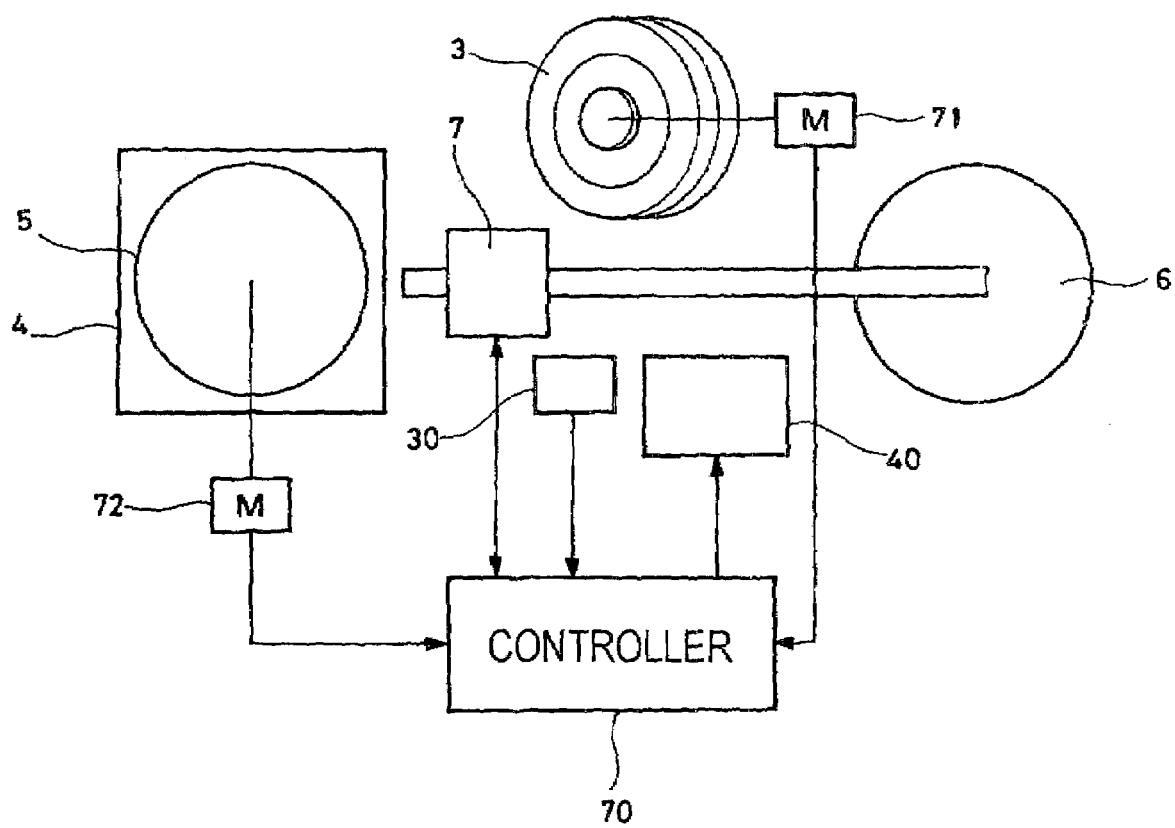
FIG. 11 is a view showing the configuration of a system for detecting dew condensation on the rotary head drum of the tape drive apparatus according to a preferred embodiment of the present invention.

FIG. 11 shows the configuration of a system for detecting dew condensation on the rotary head drum in the tape drive apparatus according to this embodiment.

This system is controlled by a control section 70 constituted by a microprocessor. That is, the control section 70 controls an operation of the carrying mechanism 7 and activates the prethreading mechanism 40 according to position information sent from the carrying mechanism 7. Thus, the control section 70 brings the tape into contact with the rotary head drum 3. During this state, the control section 70 controls and drives a drum motor 71 and causes the rotary head drum 3 to rotate.

In this prethreading state, the control section 70 monitors a rotation detection signal sent from the drum motor 71 of the rotary head drum 3. When variation in the rotation of the rotary head drum 3 is caused by dew condensation on the rotary head drum 3, the control section 70 decides that dew condensation has occured thereon.

Also, the control section 70 monitors a detection signal sent from the tension regulator 30. In the case where the tension of the tape changes due to dew condensation on the rotary head drum 3, as described above, and the change of the arm of the tension regulator 30 is detected, the control section 70 decides that dew condensation has occured thereon.

Also, the control section 70 monitors a rotation detection signal sent from the reel motor 72 for the tape supply reel 5. In the case where the tape is pulled owing to dew condensation on the rotary head drum 3 and the rotation of the tape supply reel 5 that is caused by pulling the tape due to dew condensation on the rotary head drum 3, as described above, is detected, the control section 70 decides that dew condensation has occured thereon.

Incidentally, in the tape drive apparatus according to this embodiment, it is sufficient for detecting dew condensation to use at least one of the three dew condensation detecting elements. However, combinations of these dew condensation detecting elements enable more reliable detection of the dew condensation.

Figure 12:
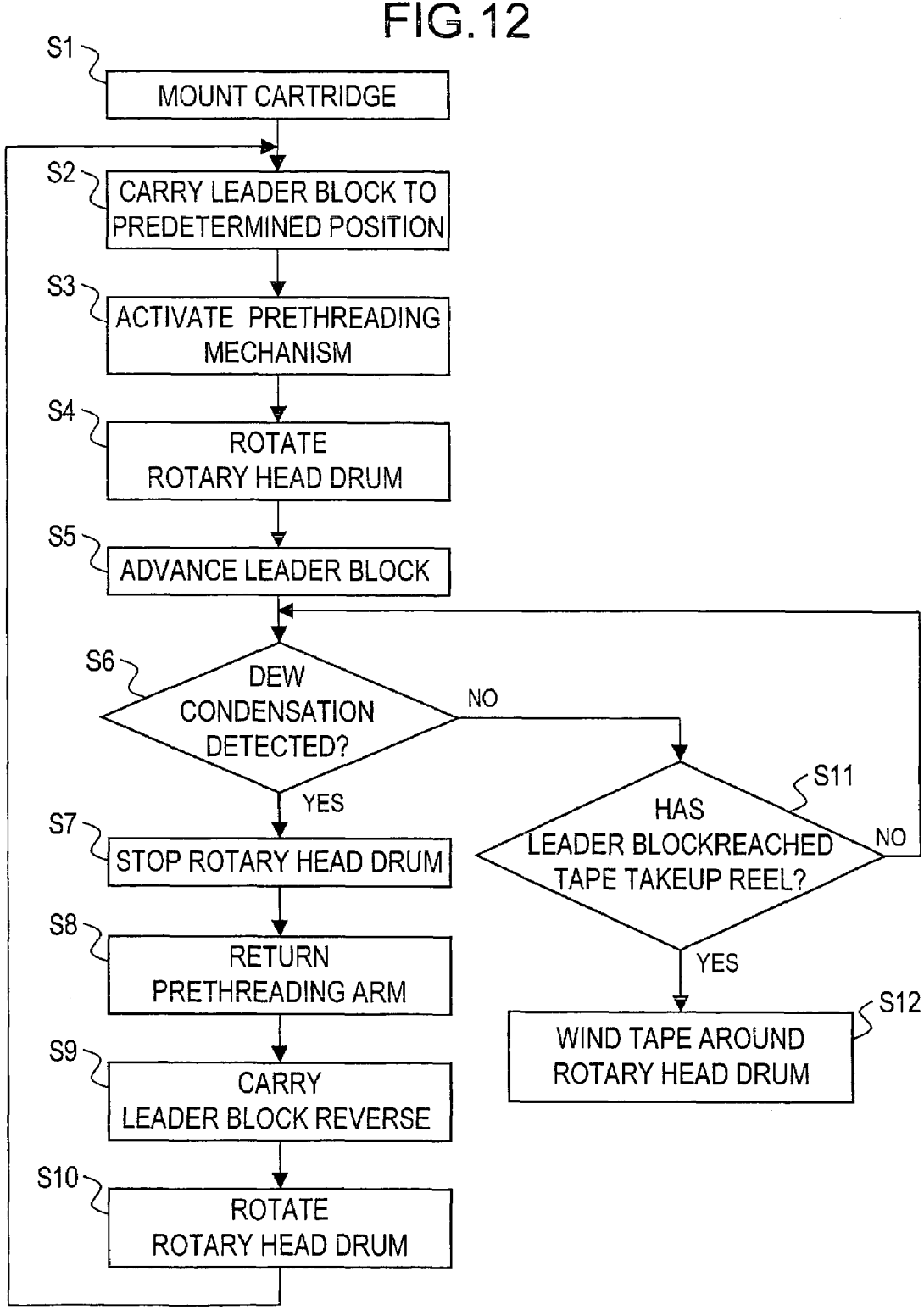
FIG. 12 is a flowchart explaining a flow of an operation of the tape drive apparatus according to a preferred embodiment of the present invention.

FIG. 12 shows a flow of an operation of the tape drive apparatus according to this embodiment.

That is, in the tape drive apparatus according to this embodiment, first, the cartridge is mounted at a mounting section of an apparatus body in step S1. Then, the carrying mechanism 7 is activated and chucks the leader block provided at a leading end of the tape T and carries the leader block 13 to a predetermined position in step S2. Thus, the tape T is drawn out of the tape supply reel 5 of the cartridge 4.

When the leader block 13 is carried to the predetermined position, the prethreading mechanism 40 is activated in step S3. Thus, as shown in FIG. 2, the tape T is drawn by the prethreading arm 42 and brought into contact with the rotary head drum 3. Then, the rotary head drum 3, having been in this state, is temporarily activated and caused to rotate at low speed in step S4. Subsequently, the leader block 13 is advanced to the tape takeup reel 6 in step S5. Then, in step S6, the rotary head drum 3 is caused to rotate during a state in which the tape T is in contact with the rotary head drum 3. Thus, detection of dew condensation on the rotary head drum 3 is performed, as described above.

When dew condensation is detected as a consequence, the rotation of the rotary head drum 3 is immediately stopped in step S7. Subsequently, the prethreading mechanism 40 is operated in reverse to thereby return the prethreading arm 42 in step S8. Thus, the tape T is detached from the rotary head drum 3. Thereafter, the carrying mechanism 7 is operated in reverse to thereby return the leader block 13 to the cartridge in step S9. Thus, the tape T is wound back to the cartridge 4.

Then, the rotary head drum 3 having been in this state is activated and caused to rotate in step S10. In this case, the rotary head drum 3 is cased to rotate at a speed that is equal to or higher than the speed in the case of performing ordinal recording/reproducing of signals. Wind caused by the high-speed rotation of the rotary head drum 3 and heat from the drum motor expedite drying of the rotary head drum 3.

After this drying operation is performed continuously for a predetermined period of time, the carrying mechanism 7 is activated again and the leader block 13 is carried to a predetermined position in step S2. Then, the prethreading mechanism 40 is activated in step S3. Thus, the tape T is put into contact with the rotary head drum 3. During such a state, the rotary head drum 3 is caused to rotate at low speed in step S4. Subsequently, the leader block 13 is advanced in step S5. Consequently, detection of dew condensation on the rotary head drum 3 is performed again in step S6.

In the case where dew condensation is not detected as a result of this dew condensation detecting operation until the leader block 13 reaches the tape takeup reel 6 in step S11, the tape takeup mechanism is then activated and the tape T is completely wound thereon in step S12.

Figure 4:
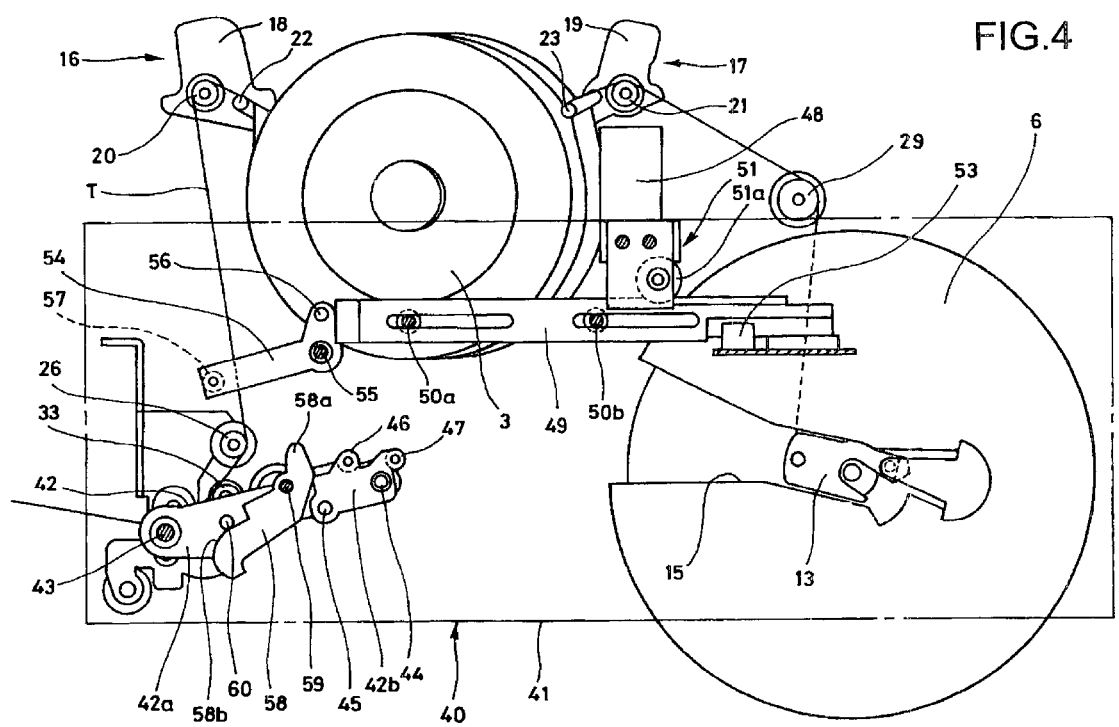
FIG. 4 is a plan view showing a state in which tape is wound around a rotary head drum, according to a preferred embodiment of the present invention.

FIG. 4 shows a state in which the tape T is wound up on the rotary head drum 3. In this state, the prethreading mechanism 40 completes the role thereof. Therefore, the prethreading arm 42 is returned to an initial position.

In the state in which the tape T is wound around the rotary head drum 3, the tape takeup reel 6 is rotation-driven to thereby wind the tape T. Thus, the tape T runs, and at the same time, the rotary head drum 3 is rotation-driven. Consequently, signals are recorded on or reproduced from the tape T.

Incidentally, in the aforementioned operation, a warning or alarm representing a dew condensation status may be indicated on the display section of the apparatus when dew condensation on the rotary head drum 3 is detected. Additionally, the cartridge 4 may be forcibly ejected when dew condensation on the rotary head drum is detected and the leader block 13 is returned to the cartridge 4.

The tape drive apparatus, which is configured and operated according to this embodiment as described above, features that the tape T having been drawn out of the cartridge 4 is brought into slight contact with the rotary head drum 3 by the prethreading mechanism 40 before the tape is completely wound around the rotary head drum 3 and, during such a state, the rotary head drum 3 is rotated thereby to detect dew condensation on the rotary head drum 3. This dew condensation detecting method enables direct detection of dew condensation on the rotary head drum 3. Thus, as compared with the conventional method for indirectly detecting dew condensation on the rotary head drum by using a dew condensation sensor, the method according to this embodiment enables quick and accurate detection of dew condensation. Especially, in the tape drive apparatus according to this embodiment, detection of dew condensation on the rotary head drum is performed midway through the operation of carrying the tape T, which has been drawn out of the cartridge 4, to the tape takeup reel 6. Consequently, detection of dew condensation can be achieved more quickly.

In the case of the tape drive apparatus according to this embodiment, detection of dew condensation has three factors, that is, variation in the rotation of the rotary head drum, change in the tension of tape, and the rotation of the tape supply reel. Therefore, more accurate detection of dew condensation is enabled by performing the detection thereof by taking combinations of these factors into consideration.

The tape drive apparatus according to this embodiment has a structure in which the prethreading arm 42 of the prethreading mechanism 40 is constituted by the folding two-stage arm including the arms 42a and 42b, and in which the tape T is put into contact with the rotary head drum 3 by extending this prethreading arm 42. The prethreading arm 42 can be built compactly into a small space in the apparatus body. Therefore, this embodiment is advantageous in downsizing the apparatus.

Additionally, the tape drive apparatus according to this embodiment may be adapted so that the tape T is detached from the rotary head drum 3 after detection of dew condensation on the rotary head drum 3 and, during this state, the rotary head drum 3 is rotated to thereby expedite the drying of the rotary head drum 3. Consequently, dew condensation on the rotary head drum can be eliminated quickly. Thus, stable tape running is enabled.

Figure 13:
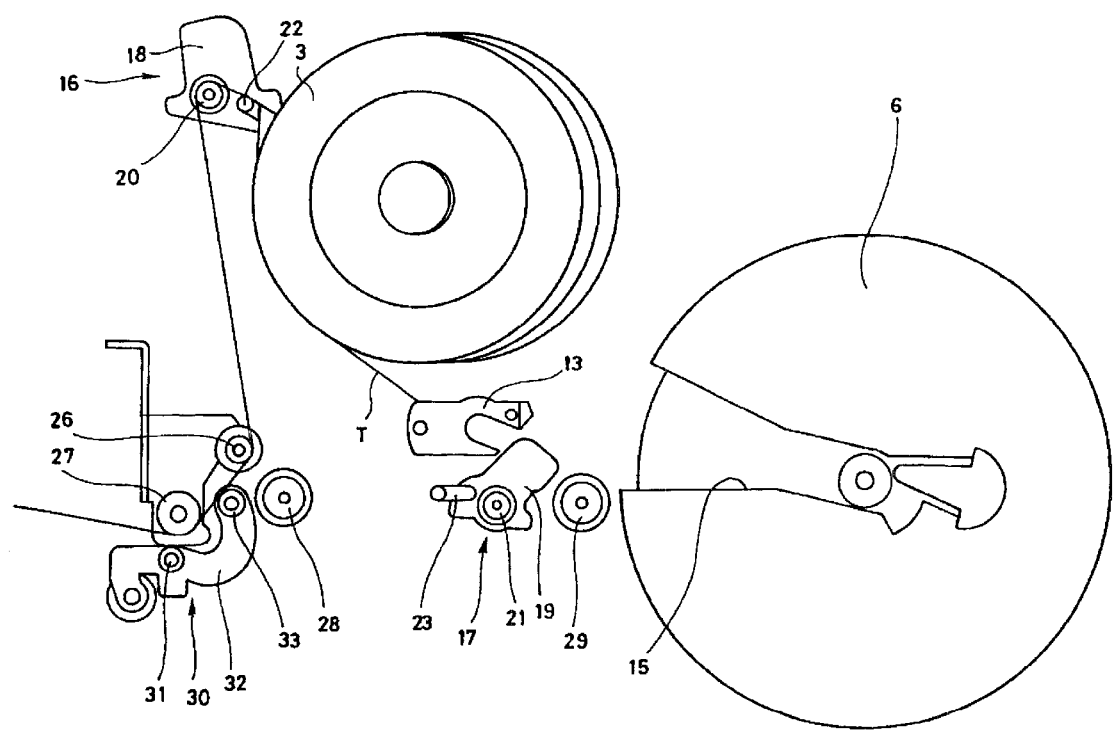
FIG. 13 is a plan view showing another example of the configuration of the major section of the tape drive apparatus according to a preferred embodiment of the present invention.

FIG. 13 shows a tape drive apparatus that is another embodiment of the present invention.

The tape drive apparatus according to this embodiment has a structure in which a tape winding member for winding the tape T around the rotary head drum 3 is also used as the prethreading mechanism for detecting dew condensation on the rotary head drum 3. In this case, one of the tape winding members 16 and 17, that is, the tape winding member 16 placed at a tape supply side (that is, at an inlet port side) also serves as a prethreading member.

That is, the tape drive apparatus according to this embodiment is adapted so that when the leader block 13 is carried to a predetermined position, first, the tape-supply-side tape winding member 16 moves to a place (which is the same place shown in FIG. 16) where the tape-supply-side tape winding member 16 can constitute a tape path to be employed in the case of performing ordinary recording/reproducing of signals, and then, the tape winding member 16 brings the tape T into contact with the rotary head drum 3 at an angle whose range is half the range of a winding angle in the case of performing ordinary recording/reproducing of signals, and the detection of dew condensation is performed by causing, during this state, the rotary head drum 3 to rotate at low speed.

Thereafter, in this tape drive apparatus, the leader block 13 is carried to a position at which the tape T is wound on the tape takeup reel 6. Subsequently, the tape-winding-side tape winding member 17 (that is, an outlet port side tape winding member 17) is moved, and then, the tape T is completely wound on the rotary head drum 3.

Although the tape drive apparatus according to this embodiment requires a relatively complex mechanism for moving each of the tape winding members 16 and 17, a prethreading mechanism 40 as shown in FIG. 5 may be omitted, and thus the configuration of the apparatus may be simplified as a whole. Consequently, this embodiment is advantageous in promoting downsizing of the apparatus.

Although the preferred embodiments of the present invention have been described above in their preferred forms with a certain degree of particularity, it should be understood that the present invention is not limited thereto and that, needless to say, other various modifications, variations, combinations and subcombinations of such embodiments and equivalents thereof may be made without departing from the scope and spirit of the present invention.

What is claimed is:

1. A tape drive apparatus in which a tape serving as a recording medium is drawn out of a cartridge accommodating the tape, the drawn tape made to run so as to be wound on a tape takeup reel provided in a tape drive apparatus body and a recording/reproducing operation performed by winding the tape drawn out of said cartridge around a rotary head drum, said tape drive apparatus comprising:

a prethreading mechanism for bringing the tape into contact with said rotary head drum before the tape is completely wound around said rotary head drum, wherein dew condensation on said rotary head drum is detected by rotating said rotary head drum during a state in which the tape is brought by said prethreading mechanism into contact with said rotary head drum, and wherein said prethreading mechanism has a folding two-stage arm, and wherein the tape is brought into contact with said rotary head drum by extending said two-stage arm.

2. The tape drive apparatus according to claim 1, wherein dew condensation is detected from a variation in rotation of said rotary head drum.

3. The tape drive apparatus according to claim 1, wherein dew condensation is detected from a change in tension of the tape.

4. The tape drive apparatus according to claim 1, wherein dew condensation is detected from a rotation of a tape supply reel of said cartridge.

5. The tape drive apparatus according to claim 1, wherein the tape is detached from said rotary head drum after the dew condensation on said rotary head drum is detected.

6. The tape drive apparatus according to claim 5, wherein drying of said rotary head drum is expedited by rotating said rotary head drum during a state in which the tape is detached from said rotary head drum.

7. The tape drive apparatus according to claim 1, further comprising a tape winding member for winding the tape around said rotary head drum, said tape winding member also serving as said prethreading mechanism.

8. A tape drive apparatus in which a tape serving as a recording medium is drawn out of a cartridge accommodating the tape, the drawn tape made to run so as to be wound on a tape takeup reel provided in a tape drive apparatus body and a recording/reproducing operation performed by winding the tape drawn out of said cartridge around a rotary head drum, said tape drive apparatus comprising:

a prethreading mechanism for bringing the tape into contact with said rotary head drum before the tape is completely wound around said rotary head drum, wherein dew condensation on said rotary head drum is detected by rotating said rotary head drum during a state in which the tape is brought by said prethreading mechanism into contact with said rotary head drum, wherein dew condensation is detected from a change in tension of the tape.

9. The tape drive apparatus according to claim 8, wherein dew condensation is detected from a variation in rotation of said rotary head drum.

10. The tape drive apparatus according to claim 8, wherein dew condensation is detected from a rotation of a tape supply reel of said cartridge.

11. The tape drive apparatus according to claim 8, wherein the tape is detached from said rotary head drum after the dew condensation on said rotary head drum is detected.

12. The tape drive apparatus according to claim 11, wherein drying of said rotary head drum is expedited by rotating said rotary head drum during a state in which the tape is detached from said rotary head drum.

13. The tape drive apparatus according to claim 8 further comprising a tape winding member for winding the tape around said rotary head drum, said tape winding member also serving as said prethreading mechanism.

14. A tape drive apparatus in which a tape serving as a recording medium is drawn out of a cartridge accommodating the tape, the drawn tape made to run so as to be wound on a tape takeup reel provided in a tape drive apparatus body and a recording/reproducing operation performed by winding the tape drawn out of said cartridge around a rotary head drum, said tape drive apparatus comprising:

a prethreading mechanism for bringing the tape into contact with said rotary head drum before the tape is completely wound around said rotary head drum, wherein dew condensation on said rotary head drum is detected by rotating said rotary head drum during a state in which the tape is brought by said prethreading mechanism into contact with said rotary head drum, wherein the tape is detached from said rotary head drum after the dew condensation on said rotary head drum is detected, and wherein drying of said rotary head drum is expedited by rotating said rotary head drum during a state in which the tape is detached from said rotary head drum.

15. The tape drive apparatus according to claim 14 wherein dew condensation is detected from a variation in rotation of said rotary head drum.

16. The tape drive apparatus according to claim 14, wherein dew condensation is detected from a rotation of a tape supply reel of said cartridge.

17. The tape drive apparatus according to claim 14, further comprising a tape winding member for winding the tape around said rotary head drum, said tape winding member also serving as said prethreading mechanism.

* * * * *